2,757,198

MODIFIED PUTRESCINE SYNTHESIS USING DIMETHYLFORMAMIDE AS SOLVENT

Bruno Vassel, Deerfield, Ill., assignor to International Minerals & Chemical Corporation, a corporation of New York No Drawing. Application May 20, 1953, Serial No. 356,317

7 Claims. (Cl. 260—583)

The present invention relates to the synthesis of diamino substituted alkanes. More particularly, it relates to the synthesis of putrescine.

Recent interest in the use of putrescine (1,4-diaminobutane) in pharmaceuticals and as an essential growth factor for certain microorganisms has led to attempts to develop a commercially acceptable method for putrescine production. It has been reported by Fernand Chambert and D. Joly, Bulletin Society Chim. France (1947), pages 1023–26, that putrescine can be produced in a yield of about 74% by the amination of 1,4-dibromobutane with a metal phthalimide followed by hydrolysis of the resulting phthalimide derivative to produce putrescine. However, this reported method is procedurally complicated and cannot be readily adapted into an industrially efficient process. In addition, the dibromobutane starting material is not available in commercial quantities, and substitution of the dichlorobutane in the above process lowered the yield of putrescine to less than 56%. The recent availability of dichlorobutane has led to attempts to discover a commercially feasible process for the production of putrescine from dichlorobutane in satisfactory yields.

It is an object of the instant invention to provide an improved method for the production of putrescine.

It is a further object of the instant invention to provide an improved method for the commercial production of putrescine from dichlorobutane.

It is a further object of the instant invention to provide a commercially feasible process for the production of putrescine in comparatively high yield.

These and other objects of the instant invention will become more apparent upon a fuller understanding of the instant invention as hereinafter set forth.

It has been discovered that putrescine can be prepared in comparatively high yield from dihalobutane when the amination reaction of the dihalobutane with a metal phthalimide is carried out in the presence of a novel solvent, that is, in dimethylformamide solvent under the conditions herein described.

In an embodiment of the instant invention 1,4-dichlorobutane is reacted with an alkali metal phthalimide, such as, sodium phthalimide, lithium phthalimide, or potassium phthalimide in the presence of dimethylformamide. The 1,4-diphthalimidobutane which forms in the reaction is separated and hydrolyzed, and putrescine is separated from the resulting hydrolysate.

In the specific embodiment of the invention the reaction is carried out by heating 1,4-dichlorobutane and a metal phthalimide in an excess of dimethylformamide solvent at a temperature between about 140° C. and about 170° C. If desired, the metal phthalimide is formed in situ by heating the 1,4-dichlorobutane and phthalimide to a temperature between about 110° C. and about 130° C., adding anhydrous potassium carbonate or sodium carbonate to the mixture and heating the resulting mixture at between about 140° C. and about 170° C. When the reaction has proceeded to substantial completion, the mixture is cooled and allowed to stand in order to crystallize 1,4-diphthalimidobutane. This product is separated, for example, by filtration and is hydrolyzed with alkali, such as with sodium hydroxide or with potassium hydroxide. Putrescine is recovered from the resulting hydrolysate, for example, as putrescine hydrochloride from which free putrescine is prepared if desired.

In the reaction of the phthalimide and 1,4-dichlorobutane, stoichiometric amounts of the reactants should be used. The reaction medium which is employed should be inert to both reactants and should dissolve both reactants at superatmospheric temperatures. Water forms in the reaction and decomposes 1,4-diphthalimidobutane. For this reason, a solvent which has a boiling point higher than the boiling point of water is employed. Although the reaction proceeds when high boiling solvents, such as benzyl alcohol, ethylene glycol, xylene, and the like are used, it was discovered that the use of dimethylformamide solvent unexpectedly almost doubled the yield of 1,4-diphthalimidobutane as compared with the other solvents.

In the past, 1,4-diphthalimidobutane has been prepared by heating the halohydrocarbon with either sodium phthalimide or potassium phthalimide. Metal phthalimides are produced by dissolving phthalimide in absolute ethyl alcohol, adding an absolute alcohol solution containing the alkali metal hydroxide, and separating the metal phthalimide, for example by filtration. The metal phthalimide should be separated immediately because it is decomposed by the water formed in the reaction.

However, it has been discovered that when dimethylformamide is employed as the solvent, the metal phthalimide can be formed in situ. For example, about 2.5 moles of phthalimide and about 1.3 moles of potassium carbonate or sodium carbonate react with about 1 mole of 1,4-dichlorobutane in between about 17 moles and about 25 moles of dimethylformamide. This reaction is carried out at a temperature above the boiling point of water so that water distills off immediately upon formation and does not decompose the product. In situ formed metal phthalimide reacts immediately with the 1,4-dichlorobutane, and only negligible amounts are lost by decomposition.

The amination reaction mixture is preferably heated to a temperature between about 140° C. and about 170° C. This reaction is substantially complete after between about one hour and about four hours, and the 1,4-diphthalimidobutane is separated from the mixture.

Hydrolysis of the 1,4-diphthalimidobutane is effected by refluxing with aqueous sodium hydroxide or potassium hydroxide. About 225 milliliters of water and about 80 grams of sodium hydroxide are preferably employed to hydrolyze each 34.8 grams (0.1 mole) of 1,4-diphthalimidobutane. The resulting hydrolysate contains water, sodium hydroxide, and basic putrescine.

Putrescine is recovered from the hydrolysate by distillation either at atmospheric pressure or under a vacuum. When a vacuum distillation is used to recover the putrescine from the hydrolysate, the evaporation of putrescine into the vacuum system should be avoided. For example, the outlet from the condensation column leads below the surface of an aqueous hydrochloric acid solution. About 1.5 times the theoretical quantity of hydrochloric acid necessary to produce putrescine hydrochloride is employed. The vacuum is applied to the surface of the hydrochloric acid receiver and has no direct connection with the distillation column. All of the putrescine can be distilled at a maximum bath temperature of about 150° C., when a vacuum of between about 15 millimeters and 20 millimeters of mercury are employed.

Putrescine, water, and when vacuum distillation is used, hydrochloric acid are present in the distillates.

When the distillation is carried out at atmospheric pressure, sufficient hydrochloric acid is added to the distillate to produce a pH of between about 1.8 and about 2.2, preferably about 2.0.

The distillate containing the putrescine is concentrated, for example, under vacuum and putrescine is then crystallized from the concentrated solution. A 3.5:6.0 volume mixture of absolute methyl alcohol and acetone causes precipitation of the putrescine from the solution. Upon chilling the resulting solution, white needles form and are separated, for example by filtration. Methyl alcohol and acetone substantially completely precipitate the putrescine hydrochloride. This product is dried, for example, at a temperature between about 65° C. and about 115° C.

When a large quantity of putrescine is to be separated another crystallization procedure involves concentration of the aqueous, vacuum-concentrated putrescine hydrochloride solution to a specific gravity of about 1.1 at about 60° C. The concentrated solution is allowed to stand for at least about ten hours, and the crystals are separated from the liquor, for example by filtration. After separation, the filtrate will contain about 47.9 grams of unprecipitated putrescine hydrochloride per each 100 milliliters of filtrate. This filtrate is either recycled to the next batch of putrescine distillate or is concentrated further for additional putrescine hydrochloride recovery. By continuously recycling the filtrates, the yields from water-crystallized putrescine is substantially the same as that obtained by the methyl alcohol-acetone precipitation.

Putrescine hydrochloride crystallizes from water in well formed white needles. These needles contain water of crystallization and are preferably dried at about 105° C. at which temperature very fine white grains are obtained.

Free, basic putrescine can be prepared but the basic putrescine has a strong tendency to adsorb carbon dioxide from the air. Basic putrescine is prepared by grinding about 0.1 mole of putrescine hydrochloride with about 0.2 mole of solid sodium hydroxide in the presence of an alkaline earth metal oxide, such as calcium oxide or barium oxide. The dry mixture is distilled into a receiver which is free of carbon dioxide.

The following examples are presented in order to afford a clearer understanding of the practice of the instant invention, but it is to be distinctly understood that these examples are illustrative only and that there is no intention to limit the invention thereto.

*Example I*

A mixture of about 127 grams of 1,4-dichlorobutane and about 367 grams of phthalimide in about 1667 milliliters of dimethylforamide was heated to about 110° C. The mixture was agitated and the container was equipped with a distillation condenser. About 175 grams of anhydrous powdered potassium carbonate was then added and the temperature of the reaction mixture was raised to about 150° C. About 25 milliliters of distillate was collected and represented about 18 milliliters of water and about 7 milliliters of dimethylformamide. The distillation condenser was changed to a reflux condenser. After about two hours refluxing time the mixture was cooled to about atmospheric temperature, and the cooled mixture was stirred for about ten hours to crystallize 1,4-diphthalimidobutane which was separated by filtration and washed with about 200 milliliters of water. The yield of 1,4-diphthalimidobutane was about 88%. When this compound was prepared in the same manner except that other solvents were employed as the medium, yields were as follows: benzyl alcohol, 47%; ethylene glycol, 51%; and xylene, 22%.

About 2625 grams of about 26% aqueous sodium hydroxide was added to 1,4-diphthalimidobutane and the resulting mixture was refluxed for about four hours. The resulting hydrolysate was vacuum concentrated, and the distillate was collected below the surface of a solution of about 300 milliliters of water and about 210 milliliters of about 37% of hydrochloric acid. When the bath temperature reached about 150° C. under a vacuum of between about 15 milliliters and about 20 milliliters of mercury, the end point of the distillation was reached. The distillate was concentrated to a specific gravity of about 1.1 at about 60° C., and the concentrated solution was allowed to cool for about ten hours. Putrescine hydrochloride crystals were separated and washed with methyl alcohol. The overall yield of putrescine hydrochloride was about 80% based upon 1,4-dichlorobutane when the crystallization liquors from the previous batch crystallization were recycled.

*Example II*

A mixture of about 127 grams of 1,4-dichlorobutane and about 367 grams of phthalimide in about 1667 milliliters of dimethylformamide was heated to about 110° C. The mixture was agitated, and the container was equipped with a distillation condenser. About 134 grams of anhydrous powdered sodium carbonate was added, and the temperature of the reaction mixture was raised to about 150° C. The distillation condenser was changed to a reflux condenser.

After two hours refluxing time the mixture was cooled to about atmospheric temperature and stored for at least about ten hours to crystallize 1,4-diphthalimidobutane which was separated by filtration and washed with about 200 milliliters of water. About 2625 grams of about 26% sodium hydroxide was added to the product, and the resulting mixture was refluxed for about four hours with an efficient condenser. The resulting hydrolysate was distilled under atmospheric pressure and a distillate which was collected through an efficient condenser was acidified with between about 135 milliliters and about 140 milliliters of about 37% hydrochloric acid. Putrescine was recovered from the distillate by the addition of a solution containing about 3.5 parts methyl alcohol and about 6.0 parts by volume of acetone.

Having thus fully described and illustrated the character of the invention, what is desired to be secured and claimed by Letters Patent is:

1. In the process for aminating a 1,4-dihalobutane involving reacting a 1,4-dihalobutane with an alkali metal phthalimide, the step comprising carrying out the reaction in dimethylformamide as a solvent medium at a temperature between about 140° C. and about 170° C.

2. An improved method for the amination of 1,4-dichlorobutane which comprises reacting 1,4-dichlorobutane with an alkali metal phthalimide selected from the group consisting of potassium phthalimide and sodium phthalimide, said reaction being carried out in dimethylformamide as a solvent medium at a temperature between about 140° C. and about 170° C., and separating 1,4-diphthalimidobutane from the resulting reaction products.

3. In the process for synthesizing putrescine involving reacting a 1,4-dihalobutane with an alkali metal phthalimide, separating 1,4-diphthalimidobutane from the resulting reaction products, hydrolyzing the 1,4-diphthalimidobutane with an alkali metal hydroxide, and separating putrescine from the resulting hydrolyzate, the step comprising carrying out the reaction of the 1,4-dihalobutane with an alkali metal phthalimide in dimethylformamide as a solvent medium at a temperature between about 140° C. and about 170° C.

4. In the process for the synthesis of putrescine involving reacting 1,4-dichlorobutane with an alkali metal phthalimide, separating 1,4-diphthalimidobutane from the reaction products, hydrolyzing said product with an alkali metal hydroxide and separating putrescine from the resulting hydrolyzate, the step comprising carrying out the reaction of the 1,4-dichlorobutane with an alkali metal phthalimide in dimethylformamide as a solvent medium at a temperature between about 140° C. and about 170° C.

5. An improved method for the synthesis of putrescine which comprises heating phthalimide and 1,4-dihalobutane in dimethylformamide as a solvent medium to a temperature between about 110° C. and about 130° C., adding an alkali metal carbonate selected from the group consisting of sodium carbonate and potassium carbonate to the hot mixture, heating the resulting mixture at a temperature between about 140° C. and about 170° C. for between about one hour and about four hours, cooling the reaction products, collecting the 1,4-diphthalimidobutane which crystallizes from the cooled mixture, hydrolyzing said compound with alkali, and separating putrescine from the resulting hydrolysate.

6. An improved method for the amination of 1,4-dichlorobutane which comprises reacting 1,4-dichlorobutane with an alkali metal phthalimide selected from the group consisting of potassium phthalimide and sodium phthalimide, said reaction being carried out in dimethylformamide as a solvent medium at a temperature of about 150° C.

7. An improved method for the synthesis of putrescine which comprises heating phthalimide and 1,4-dichlorobutane in dimethylformamide as a solvent medium to a temperature between about 110° C. and about 130° C., adding an alkali metal carbonate selected from the group consisting of sodium carbonate and potassium carbonate to the hot mixture, heating the resulting mixture at a temperature of about 150° C. for between about one hour and about four hours, cooling the reaction products, collecting the 1,4-diphthalimidobutane which crystallizes from the cooled mixture, hydrolyzing said compound with alkali, and separating putrescine from the resulting hydrolyzate.

No references cited.